United States Patent [19]

Bensinger et al.

[11] Patent Number: 5,209,700
[45] Date of Patent: May 11, 1993

[54] CONSTANT-VELOCITY JOINT

[75] Inventors: Jürg Bensinger, Hennef; Werner Krude, Neunkirchen-Wolperath; Manfred Tröster, Bad Kissingen, all of Fed. Rep. of Germany

[73] Assignees: GKN Automotive AG, Siegburg; FAG Kugelfischer, Schwinfurt, both of Fed. Rep. of Germany

[21] Appl. No.: 679,794

[22] Filed: Apr. 3, 1991

[30] Foreign Application Priority Data

Apr. 7, 1990 [DE] Fed. Rep. of Germany ....... 4011363

[51] Int. Cl.⁵ .................. F16D 3/205; F16C 33/56
[52] U.S. Cl. .................................. 464/111; 384/576; 464/132; 464/905
[58] Field of Search .............. 464/111, 120, 122–124, 464/132, 905; 384/572, 576, 523, 526

[56] References Cited

U.S. PATENT DOCUMENTS

| 4,523,862 | 6/1985 | Yasui et al. | 384/564 |
|---|---|---|---|
| 4,589,856 | 5/1986 | Mazziotti et al. | 464/111 |
| 4,684,356 | 8/1987 | Kimata et al. | 464/111 |
| 4,708,693 | 11/1987 | Orain | 464/111 |
| 4,741,723 | 5/1988 | Orain | 464/111 |
| 4,747,803 | 5/1988 | Kimata et al. | 464/111 |

FOREIGN PATENT DOCUMENTS

| 1801999 | 12/1959 | Fed. Rep. of Germany . |
|---|---|---|
| 2318341 | 10/1974 | Fed. Rep. of Germany . |
| 2748044 | 5/1978 | Fed. Rep. of Germany . |
| 2831044 | 10/1979 | Fed. Rep. of Germany . |
| 3103172 | 12/1981 | Fed. Rep. of Germany . |
| 2108562 | 2/1982 | Fed. Rep. of Germany . |
| 3540224 | 5/1987 | Fed. Rep. of Germany . |
| 3716962 | 4/1988 | Fed. Rep. of Germany . |
| 3803340 | 8/1988 | Fed. Rep. of Germany . |
| 1932926 | 5/1989 | Fed. Rep. of Germany . |
| 2228174 | 11/1974 | France . |
| 59-40016 | 3/1984 | Japan . |

Primary Examiner—Daniel P. Stodola
Assistant Examiner—William G. Battista, Jr.
Attorney, Agent, or Firm—Harness, Dickey & Pierce

[57] ABSTRACT

Constant-velocity joints in tripod construction have an external joint component (1) in which are formed three circumferentially spaced axial guide tracks (2) with bearing surfaces opposite each other in the circumferential direction. An interior joint component (3) has three circumferentially spaced radial trunnions (4) which engage in the guide tracks (2). A roller unit (8) is on each of the trunnions (4) and is radially supported in the guide tracks (2). The roller units (8) are essentially held at constant angles in the guide tracks. The roller units (8) are, relative to the trunnions (4) and radially movable with angular mobility. The roller unit (8) are each mounted, free to rotate, on a roller carrier (6). The trunnions (4) have connected to their ends, spherical heads (5) which engage a radial internal recess of the roller carrier (6). A needle bearing (7) with a cage (9) is located between each roller carrier (6) and roller unit (8).

7 Claims, 3 Drawing Sheets

CONSTANT-VELOCITY JOINT

BACKGROUND OF THE INVENTION

This invention covers a Constant-Velocity Joint in tripod construction having an external joint component in which, circumferentially spaced, three axial guide tracks are formed with bearing surfaces opposite each other in the circumferential direction; an interior joint component having three circumferentially spaced radial trunnions formed to engage in the guide tracks; and with one roller unit on each of the trunnions, radially supported in the guide tracks in which they are essentially held at constant angles, and which are—relative to the trunnions—radially movable with angular mobility, while the roller units are each mounted, free the rotate, on a roller carrier, and the trunnions have each permanently connected to their ends, spherical heads which engage in a radial internal recess of a roller carrier, radially sliding and with angular mobility.

Plain tripod-type joints whose roller units run coaxially with their respective trunnions, are burdened with the disadvantage that in a bent joint the oscillating axial movements of the rollers within their tracks do not represent a pure rolling motion but, due to the angular position of the rollers relative to the direction of motion, also include a sliding component. This tends to generate substantial frictional forces which will initiate axial vibrations propagating from the joint. Comparatively speaking, it is an improvement to have in a bent joint the roller units oscillate in their guide tracks at correct angles and with pure rolling motion while the sliding motions, i.e., (1) the radial shifting of the roller units on their trunnions, and (2) the angular motion of the roller units relative to the trunnion, occur on surface pairs independent of the guide tracks.

From DE 31 03 172 C 2, a joint of the referenced type has been known in which an interfacing ring with a spherical segment surface is allowed to slide radially along the cylindrical trunnion which in turn engages in the ball socket surface of a roller carrier. On the roller carrier, the roller unit runs on needles. The manufacturing process for this is rather complex, requiring two sets of interfacing, sliding surfaces—one of which being a ball/socket combination—to be machined.

From DE 28 31 044 A1, another tripod-type joint with a spherical trunnion has been known on which a needle bearing roller unit is directly swivel-mounted, while the individual bearing needles are retained directly in the roller unit, and directly contact the spherical trunnion. Here, the type of contact which is subjected to rather high unit loads, results in the early destruction of the bearing needles; furthermore, these unguided bearing needles which are axially secured to the roller unit in a conventional fashion, can misalign versus the roller axis, leading to malfunctions.

From DE 37 16 962 A1, a joint has been known in which an interface ring is mounted on the cylindrical trunnion, rotating on rolling elements, having a spherical outer surface which is guided in a cylindrical inner surface of the roller unit, with angular mobility and freedom to shift radially. Essentially, there is no relative rotational movement between the interface ring and the roller unit. The manufacture of this design is also rather complex, since the interface ring requires machining of a precise spherical sliding surface and also, on the roller unit, a precisely machined outer bearing surface must be produced.

From the older G 89 15 669.2, a joint of the initially cited type has been known in which the bearing needles of a needle bearing are designed to run on the cylindrical surfaces of the roller carrier (outside) and the roller unit (inside), and where roller carrier and rollers are axially, directly secured to each other in conventional ways, by means of a radial collar and retainer rings. Here also, the risk of cocking of the bearing needles relative to the axes, remains unchanged. The mutual axial retention of roller carrier and roller unit is, due to the number of parts required, rather complex in manufacture and complicated to assemble.

SUMMARY OF THE INVENTION

This invention is based on the objective to provide a joint of the initially cited type which, while improving the functional aspects, is substantially simplified in terms of design and manufacture. The solution consists of the addition of a needle bearing with a cage, between each roller carder and roller unit.

The substantial benefit of the joint according to this invention, lies in the fact that even in a bent joint, the individual needles of the needle bearings used in this design, remain perpendicular to the longitudinal direction of the guide tracks and, for that reason, will perform a pure rolling action. Through the use of a cage, any tilting, cocking or drifting of individual needles in places of maximum loads, i.e., any occurrence of the so-called circumferential end play, is made impossible. Furthermore, the potential of individual needles contacting each other, thereby increasing friction, is eliminated. As a result the rolling action of the roller units on the roller carrier remains free from any interference and occurs under ideal bearing loads.

As a minimum requirement, the roller carrier must be axially secured to the roller unit against radially inward-directed forces, since any radial shifting of the rollers—relative to the interior joint component—occurs directly between roller carrier and spherical head of the trunnion, during which certain frictional forces are applied to the roller carrier requiring appropriate support measures.

For radial means of retention, conventional retaining elements may be used, especially separate retainer rings. It is however, more beneficial and simpler in design, to use specific projections of the cage for purposes of radial retention.

According to an initial, preferred version, the design calls for the roller carrier to be—with respect to the joint axis—radially inward supported by the roller unit, via the cage, while the roller unit in turn, is directly supported by the exterior joint component. Thereby, especially those inward-directed, radial forces which, in the absence of appropriate means of retention, would lead to the disintegration of the unit consisting of roller carder, cage and roller unit, are directly supported by components of the cage. Relatedly, the preferred design approach provides that, for radial retention and support of the roller carrier toward the roller unit, the cage has—relative to the joint axis radially outward a collar with an increased diameter which, radially outward, extends above the roller unit, and—relative to the joint axis—radially inward a collar with a decreased diameter which, radially inward, extends beneath the roller carrier. These above-mentioned collars are essentially nonelastic and allow the preassembly of a unit's roller carrier, needle bearing and roller unit only in one single, uniform direction of the parts, in the sequence as indicated.

A further-developed, favorable design version provides for the roller carrier to be relative to the joint axis—radially outward directly supported by the external joint component, via a ring extension which radially extends beyond the cage. If at least between cage and roller unit, appropriate radial means of retention are provided against radial, outward-directed forces, such a ring extension can favorably prevent any direct contact between cage and external joint component, which could impede the rotational motion of the cage and thereby, the ease of operation of the joint.

In a preferred further development, the design provides that, for radial retention of the roller carrier toward the roller unit, the cage be equipped with additional elastic means of engagement which—relative to the cage axis—are located radially opposite the aforementioned collars. The aforementioned elastic means of engagement must be configured so that they will not interfere with the axial assembly of roller carrier, cage and roller unit, but would resist any disintegration under those relative radial forces experienced in the joint. The aforementioned elastic means may be provided by a circumferential elastic lip or several circumferentially distributed nubs, tabs or lugs.

The combined use of the aforementioned collars and elastic means in a one-piece construction with the cage, enable favorably the preassembly of roller carrier, needle bearing and roller unit into a captive subassembly.

As to the external shape of the roller units, there are several known configurations available, to which the contours of the guide track bearing surfaces will have to be individually adapted in a suitable manner.

Particular attention is required though, to see that for a balanced bearing load in a straight joint under torque, (1) the line of contact between trunnion and roller carrier, and (2) the line of contact on the roller opposite the bearing surfaces, shall be in a plane perpendicular to the trunnion, or—if the roller has two lines of contact with the bearing surfaces—symmetrical to the former.

According to an initial version, the bearing surfaces of the guide tracks are flat, and the roller units configured cylindrically in the zone of contact with the bearing surfaces. According to a different, related version the bearing surfaces of the guide tracks may be cylindrical in longitudinal direction, i.e., circular in cross-section, and the roller units spherical in the zone of contact with the bearing surfaces.

Correspondence between the cross-sectional contours of bearing surfaces and roller units, though, is not necessary. Thus, e.g., spherical rollers may be combined with guide track bearing surfaces of ogival cross-sections, which directly eliminates any swiveling of rollers in the tracks unlike with the aforementioned shapes. This may also be accomplished by appropriately roof-shaped cross-sections of bearing surfaces and roller units.

In any case, in order to assure a positively controlled motion pattern, it is sensible to prevent any radial or angular movements of the roller units relative to the centerline of the exterior joint component, by means of axially arranged contact shoulders along the bearing surfaces within the guide tracks, at least on the open side. Such axially arranged shoulders may directly interact with the roller units and keep the latter at constant angles in the external joint component, or interact with corresponding mating surfaces on the roller carriers in order to hold the latter at constant angles in the external joint components and thereby, achieve the same effect for the roller units. Through the use of convex cross-sections for the shoulders and/or the roller carriers or roller units in the area of contact, friction may be reduced.

BRIEF DESCRIPTION OF THE DRAWINGS

The drawing represents a design version illustrating the details of the invention.

DETAILED DESCRIPTION OF THE PREFERRED EMBODIMENT

Figure 1:
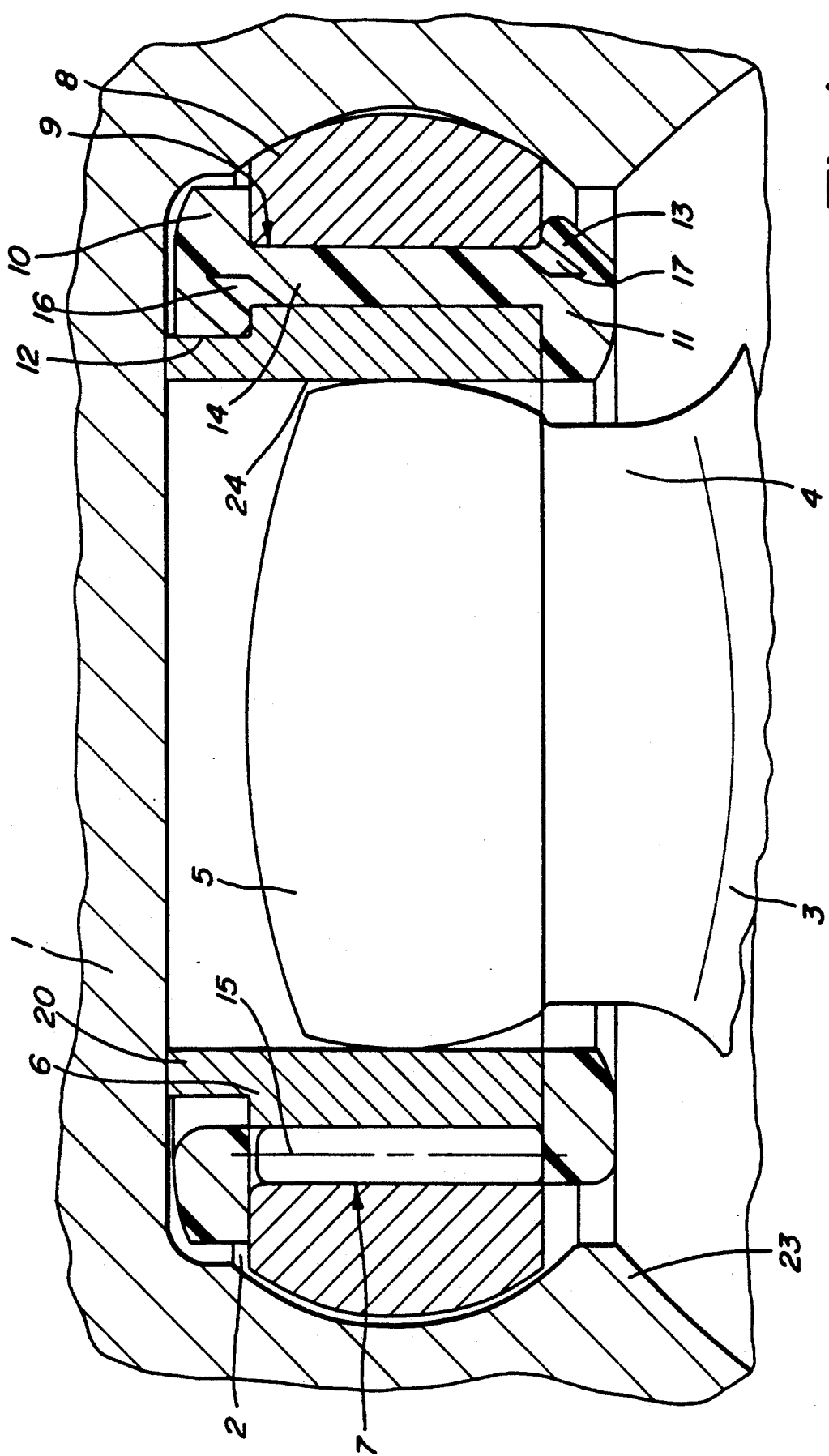
FIG. 1 shows a partial cross-section of a joint according to this invention, perpendicular to the axis in the area of a guide track.

FIG. 1 shows an external joint component (1) with a guide track (2) as well as an internal joint component (3) with an attached trunnion (4) which has a spherical head (5) with a flat top and a spherical section in the area of its contact surface, and which indirectly supports a roller unit (8) via a roller carrier (6) and needle bearing (7) consisting of a cage (9) with individual webs (14) and bearing needles (15) imbedded therein. On its—relative to the joint axis—radially outward end the cage (1) of the needle bearing (7) has a—relative to the cage axis—outward-directed collar of a diameter larger than that of the area of the webbing (14) which holds the bearing needles (15), with the collar—relative to the joint axis—radially outward extending above the roller unit. In addition, on its—relative to the joint axis—radially inward end, the cage (9) has a—relative to the cage axis—inward-directed collar of a diameter smaller than that of the area of the webbing (14) which holds the bearing needles (15), with the collar—relative to the joint axis—radially inward extending beneath the roller carrier (6). The spherical head (5) engages in the cylindrical interior recess (24) of the roller carrier (6), free to pivot and swivel. With the joint bent and rotating, such movements occur with every rotation. Radially inward-directed frictional forces applied to the roller carrier (6) by the spherical head (5), are supported via the cage (9) by the roller unit (8) which in turn, is radially supported in the guide track (2). This support is provided here directly by the track contours; in other versions the recessed shoulder (23) may also perform this function by means of direct contact with the roller unit, cage or roller carrier.

Frictional forces applied by the spherical head (5) to the roller carrier (6) in the opposite direction—radially outward—are directly supported by the external joint component (2), via a ring extension (20) of the roller carrier (6). Concerning any radially outward-directed forces, the cage (9) of the needle bearing (7) is secured against the roller unit (8) by means of elastic lugs (13) located opposite the collar (11), while additional elastic lugs (12) opposite the collar (10), provide additional retention against the roller carrier (6). The elastic lugs (12), (13) are projecting from the preferably circumferential collars (10), (11) and can be pushed into adjacent undercuts (16), (17) for ease of axial assembly of the cage. The above-described configuration of the cage (9) ensures that the roller carrier (6) is appropriately supported by the external joint component (2) against radially inward-directed as well as radially outward-directed frictional forces originating from the spherical head.

Figure 2:
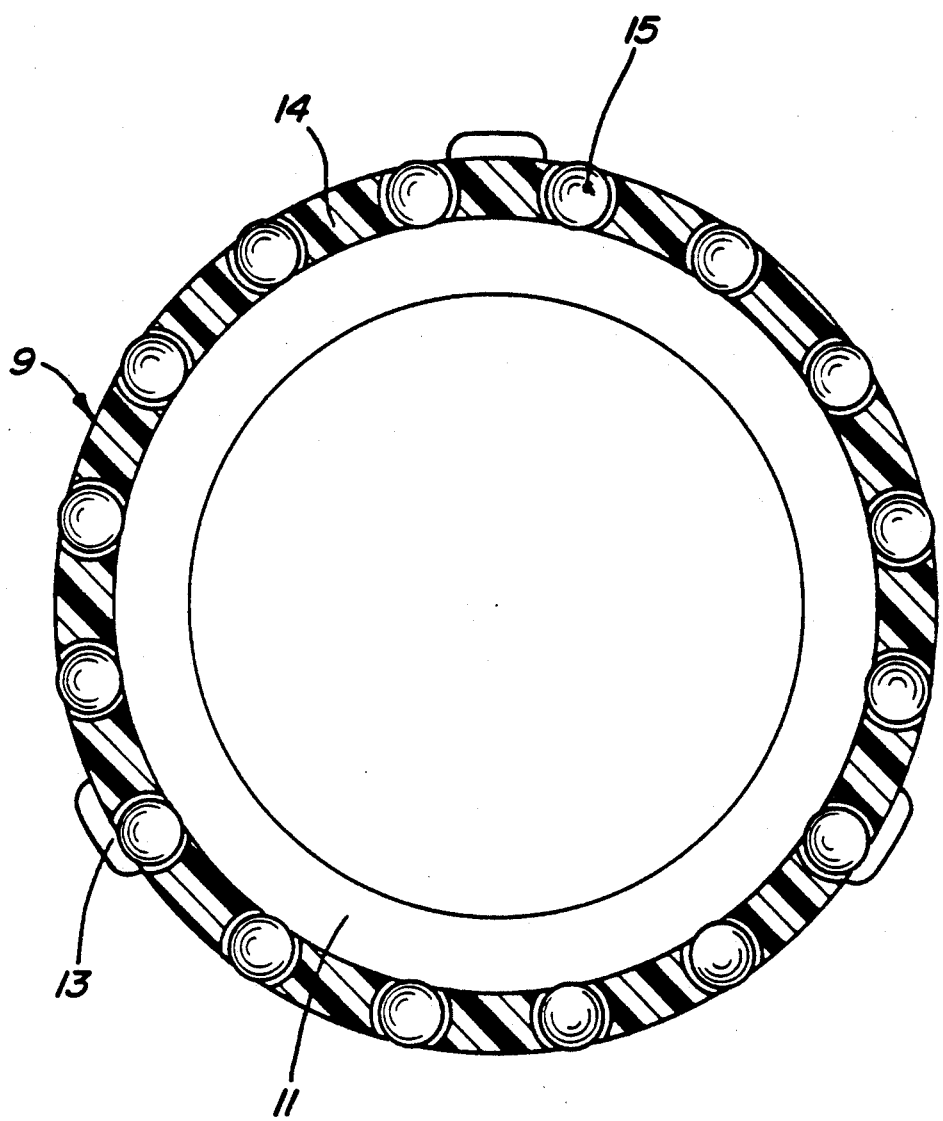
FIG. 2 shows a cage according to this invention, section A—A, according to FIG. 1.

FIG. 2 is a cross-sectional view of the cage (9) along the line A—A, showing the individual webs (14) and the bearing needles (15) embedded therein. Here, the circumferential design of collar (11) can be seen as well as the projecting areas of the lower elastic lugs (13).

Figure 3:
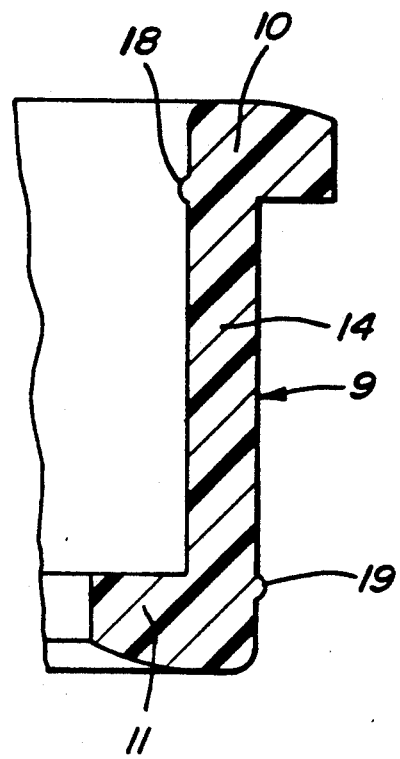
FIG. 3 shows a modified configuration of a cage according to this invention, in an axial, partial cross-section.

FIG. 3 shows the modified version of a cage (9) in a partial, axial view, specifically the outer collar (10) and the inner collar (11) with their respective elastic nubs (18) opposite the collar (10), and the elastic nubs (19) opposite the collar (11), at either end of a web (14).

Figure 4:
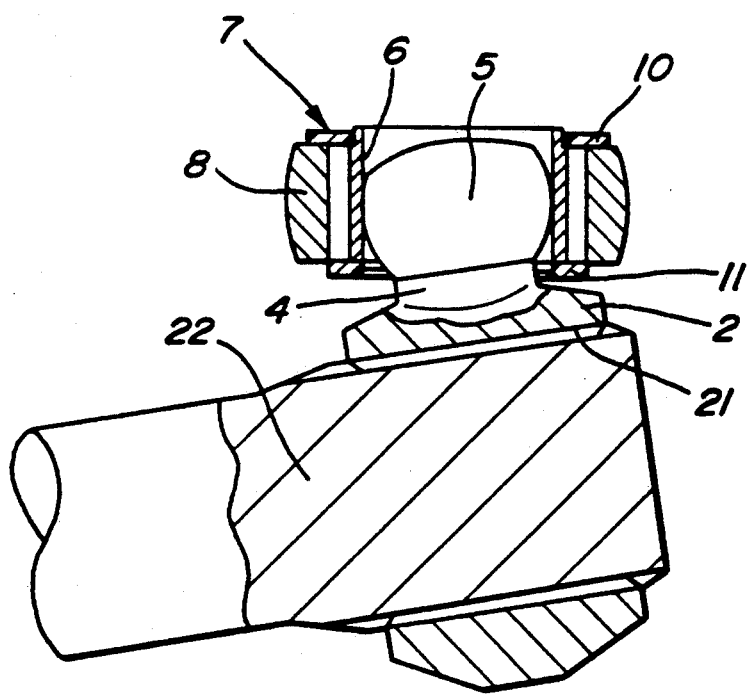
FIG. 4 shows an interior joint component according to this invention, with the inserted end of a shaft and a roller unit tilted relative to the spherical trunnion, in longitudinal cross-section.

In FIG. 4, all corresponding details are called out by the same reference numbers as used in the preceding drawings. The interior joint component (2) is shown here as a whole, with its toothed interior recess (21) which is engaged by the end of a shaft (22) with external toothing. Here, the roller carrier (6), the needle bearing (7) and the roller unit (8) are captively retained by means of the collars (10), (11) and the nubs, not shown in detail, even before insertion into the exterior joint component.

We claim:

1. A tripod constant-velocity joint comprising:
   an external joint component having three circumferentially spaced axial guide tracks with bearing surfaces opposite each other in the circumferential direction;
   an interior joint component having three circumferentially spaced radial trunnions formed to engage in the guide tracks, said trunnions having spherical heads;
   a roller carrier having a radial internal recess engaging said trunnions and said trunnions being slidable and having angular mobility in said recess;
   one roller unit on each of the trunnions supported in the guide tracks, each roller unit is substantially held at constant angles, and, relative to the trunnions, is movable with angular mobility, and said roller units are each mounted, free to rotate, on said roller carriers;
   a needle bearing assembly having a cage located between each roller carrier and roller unit;
   and means for radially inwardly supporting the roller carrier, relative to the joint axis, by the roller unit via the cage, while said roller unit is in turn radially inwardly directly supported by the external joint component.

2. The joint according to claim 1 wherein a ring extension radially outward directly supports the roller carrier, relative to the joint axis, said ring extension projecting beyond the cage.

3. The joint according to claim 1 wherein said means for radial support of the roller carrier against the roller unit is coupled with the cage and relative to the joint axis, said means and cage including a radially outwardly first collar, webbing for holding said bearing needles, said first collar is of a larger diameter than the webbing with the first collar radially outwardly extending above the roller unit, and a radially inwardly second collar of a smaller diameter than the webbing holding said bearing needles, with the second collar radially inwardly extending beneath the roller carrier.

4. The joint according to claim 3 including elastic engagement means for enhancing retention of the roller unit with the roller carrier, said elastic engagement means is coupled with said cage and located radially opposite the first and second collars.

5. The joint according to claim 4, wherein for retention purposes, the means of engagement consists of elastic and, relative to the cage axis, radially deformable lugs or nubs.

6. The joint according to claim 1, wherein the cage is of a formed plastic one-piece construction.

7. The joint according to claim 1, wherein the cage is made of a plastic material.

* * * * *

UNITED STATES PATENT AND TRADEMARK OFFICE
CERTIFICATE OF CORRECTION

PATENT NO. : 5,209,700
DATED : May 11, 1993
INVENTOR(S) : JÖRG BENSINGER ET AL

It is certified that error appears in the above-indentified patent and that said Letters Patent is hereby corrected as shown below:

```
Item [75],
Title Page, Inventors, "Jürg" should be --Jörg--.
```

Signed and Sealed this

Seventeenth Day of May, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,209,700
DATED : May 11, 1993
INVENTOR(S) : Jörg Bensinger, et al

It is certified that error appears in the above-indentified patent and that said Letters Patent is hereby corrected as shown below:

On the Title Page, Item [73], "Sshwinfut" should be --Schweinfurt--.

Signed and Sealed this

Twelfth Day of July, 1994

Attest:

BRUCE LEHMAN

Attesting Officer

Commissioner of Patents and Trademarks